UNITED STATES PATENT OFFICE.

JOHN W. LAFER, OF CATAWBA ISLAND, OHIO.

INSECTICIDE.

No. 914,430.  Specification of Letters Patent.  Patented March 9, 1909.

Application filed September 16, 1907. Serial No. 393,043.

*To all whom it may concern:*

Be it known that I, JOHN W. LAFER, a citizen of the United States, residing at Catawba Island, in the county of Ottawa and State of Ohio, have invented a certain new and useful Insecticide Composition, of which the following is a specification.

My composition is prepared by mixing the following ingredients, in the proportion stated, viz:

| | |
|---|---|
| Potassium hydroxid | 5 oz. |
| Sodium hydroxid | 17 oz. |
| Arsenious oxid | 20 oz. |
| Chlorid of iron, (ferric chlorid, preferred) | 1 oz. |
| Lime, unslaked | 3¾ lbs. |
| Sulfur, pulverized preferred | 6 lbs. |
| Water, substantially pure | 100 gals. |

The aforesaid ingredients are thoroughly mingled by the means of the agitation hereinafter set forth, so that they will be fully acted upon by each other.

To ten ounces of water taken from the one hundred gallons add the five ounces of potassium hydroxid and apply heat: to the aforesaid add five ounces of sodium hydroxid dissolved by ten ounces of water taken from the remaining portion of the one hundred gallons and warmed, and thereafter agitate the same by applying heat to the extent of causing a slow boil: then add twenty ounces of arsenious oxid, substantially pure, and agitate all of the aforesaid preparation by boiling for ten minutes, and permit the same to cool slowly thereafter: a chemical reaction takes place from the aforesaid, wherefrom sodium arsenite and potassium arsenite is formed: to the aforesaid add one ounce of chlorid of iron solution, preferably ferric chlorid, so that by chemical reaction ferric arsenite will have been formed, and agitate the preceding preparation by stirring well for a few moments and thereafter permit the same to stand for a short time and then add the following preparation. Add sufficient warmed water taken from the remaining portion of the one hundred gallons to slake three and three-quarters pounds of fresh unslaked stone lime, substantially pure, whereby will be obtained calcium hydroxid, and to this add six pounds of pulverized sulfur, agitating the same by thoroughly mixing, and from which will be obtained calcium di-sulfid to an approximated amount of one hundred and thirty-nine ounces: to this latter preparation add twelve ounces of sodium hydroxid which previously has been dissolved by one quart of warmed water taken from the remaining portion of the one hundred gallons and from the said reaction we will have sodium di-sulfid of an approximated amount of twenty-five and sixty-five one-hundredths ounces, and all of which agitate by boiling for about three quarters of an hour, and in the mean time stir the same to keep it in a very plastic state and extract therefrom the liquid which add to the preparation which herein before was permitted to stand for a time: on adding the extracted liquid a chemical reaction takes place wherefrom is produced calcium arsenite to the approximate amount of two and nine one-hundredths of an ounce which with the ingredients previously described is agitated by thoroughly mixing the same through the means of stirring and in the mean time the remaining portion of the one hundred gallons of water is added thereto.

In using the above described composition, the roots of the plants, shrubs and trees should be preferably moistened and fed by saturating the soil, in and about the base thereof, with the same: the composition can be readily applied however to other external portions of the plant or tree and will be absorbed and caused to circulate with the sap by inoculating the same.

By the use of the above described composition, the sap which is inoculated by the ingredients thereof will cause the various worms, scales and insects to die and become exterminated through the means of feeding on the same: and is further useful in destroying various disease germs of plants, shrubs and trees and will cause the same to regain, and to remain in a healthy condition.

I am aware that compositions containing some similar ingredients have heretofore been used for external application on plants, shrubs and trees for the purpose of killing disease germs, but I am not aware of the fact that any or all the ingredients of my composition have ever been used together for such a purpose.

What I claim, and desire to secure by Letters Patent of the United States, is—

An insecticide comprising sodium arsenite, potassium arsenite, ferric arsenite, calcium di-sulfid, sodium di-sulfid, calcium arsenite and water, in the described proportions.

In testimony whereof I affix my signature in presence of two witnesses.

JOHN W. LAFER.

Witnesses:
  U. G. TOWNSEND,
  J. V. DAVEY.